United States Patent [19]

Bes et al.

[11] Patent Number: 4,484,952
[45] Date of Patent: Nov. 27, 1984

[54] PARTICULATE COLORING COMPOSITION MADE BY PRILLING

[75] Inventors: Richard F. T. Bes, AM Apeldoorn; Jan D. Knol, HJ Epeldoorn; Gooitsen Roest, LL Apeldoorn, all of Netherlands

[73] Assignee: Holland Colours Apeldoorn B.V., Netherlands

[21] Appl. No.: 520,251

[22] Filed: Aug. 3, 1983

Related U.S. Application Data

[63] Continuation of Ser. No. 226,599, Jan. 21, 1981, abandoned.

[30] Foreign Application Priority Data

Jan. 24, 1980 [NL] Netherlands .......................... 8000464

[51] Int. Cl.$^3$ ............................................... C09C 1/00
[52] U.S. Cl. ............................... 106/308 Q; 106/272; 106/288 Q; 106/301; 106/307; 106/308 N; 106/308 F; 264/13
[58] Field of Search ........... 106/308 F, 308 N, 308 Q, 106/272; 264/13, 117

[56] References Cited

U.S. PATENT DOCUMENTS

| | | | |
|---|---|---|---|
| 3,404,019 | 10/1968 | Gotshall | 106/308 F |
| 3,953,218 | 4/1976 | Pollard | 106/308 F |
| 4,158,571 | 6/1979 | Lynch et al. | 106/272 |
| 4,230,501 | 8/1980 | Howard et al. | 106/308 Q |
| 4,271,211 | 6/1981 | Knepper | 106/308 F |
| 4,285,994 | 8/1981 | Pearce et al. | 264/13 |
| 4,310,483 | 1/1982 | Dorfel et al. | 264/117 |

FOREIGN PATENT DOCUMENTS 2646965  4/1977  Fed. Rep. of Germany ... 106/308 F

OTHER PUBLICATIONS

Condensed Chemical Dictionary-8th ed., (1971), pub. by van Nostraud Reinhold Co., N.Y., p. 77, "Armid"; pp. 176–177, Castor Oil, Hydrogenated, and Castorwax; p. 319, di(n-octyl, n-decyl)phthalate; p. 665, Pentaerythritol Tetrastearate; p. 699, Plasticizer; p. 825, Stearamide.

*Primary Examiner*—Helen M. McCarthy
*Attorney, Agent, or Firm*—Ostrolenk, Faber, Gerb & Soffen

[57] ABSTRACT

Coloring composition in finely divided form, obtained by mixing a meltable organic carrier with a pigment and finely dividing the composition. The organic carrier consists of a mono or tetra ester of pentaerythritol and stearic acid, stearylamide, ethylene bisstearylamide or hydrogenated castor oil.

For adjusting the melting range and the viscosity of the composition, metal soaps, waxes or phthalic acid esters may be added.

13 Claims, No Drawings

PARTICULATE COLORING COMPOSITION MADE BY PRILLING

This is a continuation of application Ser. No. 226,599, filed Jan. 21, 1981, now abandoned.

BACKGROUND OF THE INVENTION

1. Field of the Invention

The present invention relates to a coloring composition for coloring articles, obtained by mixing at least one coloring pigment with a carrier being solid at ambient temperatures and having a melting point of below 150° C.

2. Description of the Prior Art

A coloring composition of this type is known in the prior art. In said known coloring composition, the pigments are dispersed in N-alkyl-substituted fatty acid amides or compounds formed by reacting diamines with hydrostearic acid.

Said known coloring compositions have the drawback that much energy is required for their preparation, in view of the high melting temperatures of such amides. These high temperatures may also be disadvantageous as to the stability of the pigment.

Coloring compositions comprising a carrier in which the coloring pigments are divided lend themselves very well for processing coloring pigments.

Actually, a direct processing of coloring pigments in products will be rather annoying for the respective laborers, which counts the more for carbon black as used in rubbers. On the other hand, during said direct processing of coloring pigments fine dye particles or pigments polluting the environment may escape.

Although a homogeneous division of pigments in liquid or paste-shaped binding agents may take place in relatively cheap productive machines, and will require little energy, whilst the temperatures will remain low, the dispensable products obtained thereby are highly viscous pastes, which offer the disadvantage that on processing them, they will pollute their packages and metering apparatus to a greater extent than powdered products or granules.

SUMMARY OF THE INVENTION

In view of the foregoing factors and conditions of the prior art, it is a primary object of the present invention to provide a coloring composition which alleviates the abovementioned drawbacks and which is solid at ambient temperatures, so that it can be easily handled, transported and dispensed.

Said object is attained in accordance with the present invention in that the carrier is an organic compound of the general formula

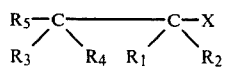

wherein (a) if X is a free or esterified hydroxyl group, $R_1$ $R_2$ are hydrogen and $R_3$, $R_4$ and $R_5$ represent, whether or not esterified hydroxymethyl group;

(b) if X is a free or esterified hydroxyl group, $R_2$, $R_3$ and $R_4$ are hydrogen and $R_5$ represents an unsaturated alkyl group and $R_1$ a carboxyl alkyl group (c) if X is a $NH_2$ group, $R_1$ and $R_2$ represent a=O group, $R_3$ and $R_4$ hydrogen and $R_5$ is a saturated alkyl-group.

Suitable meltable carriers are stearylamide (mp 99° C.), ethylenebisstearylamide (mp 143° C.), hydrogenated castor oil (mp 84° C.) and esters of pentaerythritol, particularly the mono and tetra esters of stearic acid (melting points 50°–53° C. and 64° C. respectively).

Pentaerythritol esters present the great advantage that they are allowed in products according to the Sale of Food and Drugs Act and can provide compositions having a high pigmentation ratio without using detergents while they present a much lower melting point than e.g. glycerol monostearate. Compositions containing pentaerythritol esters present also the advantage that the particles of the compositions do not stick together during storage, contrary to particles containing glycerol monostearate. The last mentioned compound crystallizes in a metastable state which metastable state changes into a stable state, involving a temperature increase and sticking together of the small particles of the composition.

Many of the abovementioned advantages also hold for other carriers as used according to the present invention.

In order to adjust the melting behavior and the viscosity, the composition may advantageously contain metal soaps, preferably in a quantity ranging from 0 to 5%. Preferably used metal soaps are calcium, zinc, cadmium and lead stearate.

For the above aim hydrocarbons, such as waxes and/or low molecular polymer compounds may also be used.

Finally, the composition may comprise, whether or not liquid, esters of dicarboxylic acids, preferably aromatic dicarboxylic acids; said esters are preferably used in quantities ranging from 0 to 15%. Suitable esters are esters of phthalic acid and alcohols comprising 4 to 8 carbon atoms. Esters of alcohols with 4 carbon atoms are flowable, whereas esters of alcohols comprising 12 carbon atoms are solid.

The pentaerythritol esters are advantageously esters of higher fatty acids comprising 12 to 18 carbon atoms.

Due to the use of a meltable carrier having a relatively low melting or plasticizing point, the coloring pigments may easily be divided which is rather important when dividing and dispensing coloring pigments in thermoplastics, thermosetting resins, cosmetic products, rubbers, insecticides, pharmaceutical products, paints, foodstuffs, printing inks and so on.

The coloring composition very advantageously comprises a surface-active substance, such as an anionic, cationic or non-ionic substance, which substance may advantageously and favorably influence the pigmentation ratio, the stability and the rheological properties of the coloring composition. The expression "pigmentation ratio" is defined as the quantity of pigment or coloring substance in the composition.

Very advantageously, said pigmentation ratio is comprised between 15 and 95%, and more preferably between 20 and 85%.

When the ratio of 85% is exceeded, the meltable carrier will loose its liquid properties, so that the advantages in accordance with the invention can no longer be obtained, whilst a pigmentation ratio below 15% will cause the suspension to easily precipitate and to be unstable.

By adding surface-active substances the pigmentation ratio may, however, be increased to 95%.

As a surface-active substance, preferably an anionic surface-active substance is used in combination with certain organic pigments, whilst a non-ionic surface-active substance is used in combination with organic pigments and inorganic pigments.

The melting point of the meltable carrier, is appropriately comprised between 40° and 145° C. and more preferably between 50° and 100° C.

The coloring composition advantageously consists of finely ground particles, such as flakes, granules, grains and the like.

In order to obtain such particles, the molten carrier comprising the divided coloring pigment, may be pressed through a perforated bottom, whereupon the drops will fall upon a watercooled stainless-steel cooling belt and will subsequently solidify.

Another possibility is to have the mixture solidified in molds, having dimensions of, for instance, 200×50×20 mm and to press the obtained moldings against a rotating cylindrical grate, whereupon grated shavings of the composition are obtained.

Said shavings granulate is not a free flowing product and it is therefore recommended for coloring powders and irregular granulates, such as for instance plastic regenerates. In the latter use, the insufficient flow properties of the pigments will prevent separation of the concentrate.

Finely grained pigment concentrates may also be obtained by spraying the melt in air at ambient temperature whereby particles are obtained having a particle size ranging from 0.2 to 2 mm.

The features of the present invention which are believed to be novel are set forth with particularity in the appended claims.

Other claims and many of the attendant advantages will be more readily appreciated as the same becomes better understood by reference to the following detailed examples.

DESCRIPTION OF EXAMPLES

EXAMPLE I 2.5 kg of molten pentaerythritol tetrastearate is mixed with 7.5 kg of Cadimum Sulphite yellow. After the mixing procedure, the composition is solidified in molds, into moldings of 200×50×20 mm, whereupon said moldings are brought into contact with a rotating grate, thereby forming shavings from 0.5 to 3 mm. The coloring composition thus obtained is not free-flowing, but can be properly used for coloring powders and irregular granulates, such as a plastic regenerate. The insufficient flowing properties of the respective pigment will prevent a separation of the concentrate.

EXAMPLE II 20 kg of carbon black is mixed with 80 kg of hydrogenated castor oil (mp 84° C.) in a vessel heated by a water mantle, whereupon the composition is passed through a pearl mill and a coloring composition is obtained being very suitable for coloring rubbers.

EXAMPLE III

The procedure according to Example II is repeated, but 25 kg of carbon black is added to 75 kg of pentaerythritol tetrastearate, whilst furthermore an anionic surface-active substance in the form of 0.5 to 1 kg Ser Ad FA 192 is added. A free flowing coloring composition is thus obtained, which is easily incorporated in a rubber.

EXAMPLE IV 85 kg of brown coloring pigment is mixed with 25 kg of a mixture consisting of 85 parts of pentaerythritoltetrastearate and 15 parts of dioctylphtalate. By finely dividing the composition, excellent coloring concentrates are obtained which are suitable for a incorporation in cosmetic products.

EXAMPLE V 50 kg of phthalocyanine is mixed with a mixture of 50 kg consisting of 15 kg of pentaerythritol monostearate, 1 kg of phthalic acid esters of alcohols comprising 4 to 8 carbon atoms, 30 kg of hydrocarbons in the form of waxes and 4 kg of metal soaps. Said metal soaps consist of equal parts of zinc and calcium stearate. The mixture thus obtained is in a liquid state sprayed in a cylindrical vessel having e.g. a diameter of 6 m, a height of 1.20 m and a conical bottom with a top angle of approximately 60° C.

A horizontally rotating heatable disk is disposed on top of the axis of the cylindrical vessel, the melt being fed to this disk. The centrifugal force will force the liquid toward the edge of the disk, said liquid then passing the disk and leaving the same as a filament or as a film, dependent upon the flowing properties.

The filaments or film respectively, will form droplets, starting in a horizontal plane, and gradually forming an ever-inclining spray screen, dependent upon the distance toward the wall of the vessel, which will get gradually smaller.

Provided the contours of the spheres will not get too large, the cooling time for a complete solidification appears to be sufficient.

The lower side of the spray screen is forced inwardly by means of a tangential air-inlet.

The product obtained according to the aforedescribed spray-solidification or prill-process has a particle size of 0.2 to 2 mm and is excellently free-flowing and absolutely dustfree. It lends itself particularly for a volumetric dispension and is very suitable for coloring powdered products and similar masses.

By adding phthalic acid esters, waxes and metal soaps, the flow behavior of the carrier may be adjusted in such a way that lower working temperatures are possible for forming the liquid mixtures in comparison with mixtures not containing the phtalic acid esters, waxes and metal soaps.

The pigmentation ratio can be increased by 10% by adding 0.5 kg of a non-ionic surface-active substance.

EXAMPLE VI

The mixture according to example I is used with a drip granulator, consisting of a cylindrical rotor with four metering compartments, each compartment being filled per revolution with melt to such an extent that an air cushion is formed above them under a certain overpressure.

The compartments are slidingly sealed off, due to the cylindrical inner wall and the horizontal bottom plate of the stator.

Said bottom plate is provided with perforations across a certain width, opposite the inlet point.

As part of the revolution passes over the perforations, the air cushion will expand and will cause the paste to be pressed through the open lower side of each compartment and the pores. In order to prevent an undesired solidification of the melt, said bottom plate is electrically heated. The drops, pressed outside at the lower side of the granulator, will fall on a water-cooled stainless steel cooling belt and will solidify and are then caught in a container. The shape of the drops varies dependent upon the surface tension, the density and the consistency between the lens-shape and the conical shape.

The particles will generally have a weight ranging from 100 to 300 mg. Said granules lend themselves particularly well for coloring powdered products and coherent masses, such as thermosetting resin mixtures.

EXAMPLE VII

Example II is repeated by using 80 kg of stearylamide (mp. 99° C.) instead of 80 kg of hydrogenated castor oil. An excellent free-flowing composition is obtained.

EXAMPLE VIII

Example III is repeated by using 80 kg of ethylene bisstearylamide (mp 143° C.) instead of hydrogenated castor oil.

EXAMPLE IX

Example I is repeated by adding 0.1 kg of calciumstearate and increasing the amount of cadmiumsulfide yellow to 12.0 kg. An excellent composition is obtained.

What is claimed is:

1. Coloring compositions for coloring articles, obtained by the process of mixing in the absence of water and organic solvent particles of at least one coloring pigment with a molten carrier solid at ambient temperatures and having a melting point of below 150° C., wherein the carrier consists essentially of hydrogenated castor oil or an organic compound of the general formula

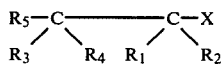

in which
(a) if X is a free or esterified hydroxyl group, $R_1$, $R_2$ are hydrogen and $R_3$, $R_4$ and $R_5$ represent a free or esterified hydroxymethyl group;

(b) if X is a $NH_2$ group, $R_1$ and $R_2$ represent a=O group, $R_3$ and $R_4$ hydrogen and $R_5$ is a saturated alkyl group; wherein the pigmentation ratio of the coloring composition is between 15 and 95%, and wherein said mixture is thereafter prilled.

2. Coloring composition according to claim 1, in which the carrier is hydrogenated castor oil or esters of pentaerythritol.

3. Coloring composition according to claim 1, in which the carrier is a monoester or tetraester of pentaerythritol.

4. Coloring composition according to claim 1, in which the melting point of the carrier is comprised between 50° and 100° C.

5. Coloring composition according to claim 1, in which the pigmentation ratio of the coloring composition is comprised between 20 to 85%.

6. Coloring composition according to claim 1, in which the composition contains a surface-active substance chosen from the group of non-ionic surface active substances, used in combination with an organic or inorganic pigment and of an anionic surface-active substance, used in combination with an organic pigment.

7. Coloring composition according to claim 1, in which the composition comprises 0 to 15% of aromatic dicarboxylic acid esters, being at least solid at ambient temperatures.

8. Coloring composition according to claim 1, in which the composition comprises 0 to 5% of metal soaps.

9. Coloring composition according to claim 3, in which the monoester or tetraester is an ester of a fatty acid of 12 to 18 carbon atoms.

10. Coloring composition according to claim 7, in which the aromatic dicarboxylic acid ester is a phthalic acid ester of a 4 to 12 carbon atom alcohol.

11. Coloring composition according to claim 8, in which said metal soap is a stearate of calcium, zinc, cadmium or lead, or a mixture thereof.

12. Coloring composition according to claim 1, in which the mixture of pigment particles and molten carrier is sprayed in air at ambient temperature whereby particles of said admixture are obtained.

13. Coloring composition according to claim 12, in which the particles obtained have a particle size of 0.2-2 mm.

* * * * *